United States Patent [19]

Li

[11] Patent Number: 5,631,883
[45] Date of Patent: May 20, 1997

[54] COMBINATION OF BOOK WITH AUDIO DEVICE

[76] Inventor: Yi-Yang Li, Suite 1, 11F. No. 95-8 Chang Ping Rd. Sec. 1, Taichung, Taiwan

[21] Appl. No.: 503,331

[22] Filed: Jul. 17, 1995

Related U.S. Application Data

[63] Continuation of Ser. No. 276,420, Jul. 18, 1994, abandoned, which is a continuation of Ser. No. 995,134, Dec. 22, 1992, abandoned.

[51] Int. Cl.$^6$ ............................. G11B 17/22; G11B 31/00
[52] U.S. Cl. ............................ 369/31; 369/64; 434/317; 434/311
[58] Field of Search ............................ 369/1, 2, 3, 4, 369/5, 31, 63, 64; 360/1, 12; 365/45, 47, 48; 434/317, 178, 308, 335, 169, 311

[56] References Cited

U.S. PATENT DOCUMENTS

| | | | |
|---|---|---|---|
| 4,355,984 | 10/1982 | Slavik et al. | 434/335 |
| 4,636,881 | 1/1987 | Brefka et al. | 369/31 |
| 4,703,573 | 11/1987 | Montgomery et al. | 434/169 |
| 4,809,246 | 2/1989 | Jeng | 369/31 |
| 4,884,974 | 12/1989 | Desmet | 434/317 |
| 5,209,665 | 5/1993 | Billing et al. | 434/169 |

OTHER PUBLICATIONS

Language Teaching Apparatus, PCT/AU87/00127, Nov. 5th, 1987.

*Primary Examiner*—Tan Dinh
*Attorney, Agent, or Firm*—Beveridge, DeGrandi, Weilacher & Young, L.L.P.

[57] ABSTRACT

A combination of a book with an audio device includes a book and an audio device attached to the back cover of the book for audibly reproducing predetermined text printed on the pages. Different identification labels are attached to the end edge of the pages. These labels are composed of an insulation tape with an U-shape conductive stripe printed thereon which is different for each page. The audio device includes a ROM memory having the spoken messages corresponding to the printed text on the pages pre-stored therein in digitized form. Other electronic components for audibly reproducing the spoken message are included. A contact plate pivotally secured on a lower section of the audio device contacts the identification labels on the book pages. A plurality of parallel disposed conductive stripes on the inner surface of the contact plate connect to the respective electronic components of the audio device. Transient engagement of the contact plate with the identification label will trigger an identifying trigger signal to extract a spoken message from the ROM memory corresponding to the printed text on an open page. The spoken message is audibly reproduced through a speaker so that the user can hear with he is reading.

20 Claims, 8 Drawing Sheets

COMBINATION OF BOOK WITH AUDIO DEVICE

CONTINUING APPLICATION DATA

This application is a continuation of U.S. patent application Ser. No. 08/276,420, filed Jul. 18, 1994, abandoned which is a continuation of U.S. patent application Ser. No. 07/995,134, filed Dec. 22, 1992 (now abandoned). U.S. patent application Ser. Nos. 08/276,420 and 07/995,134, abandoned, are entirely incorporated herein by reference.

BACKGROUND OF THE INVENTION

The present invention relates to audio books, more particularly to a combination of a book with an audio device which provides spoken text related to the page of a book in order that the reader of this text can hear what he is reading.

Prior art audio books vary in types. They are most likely storing the text of a book in a magnetic tape and then reproduce it audibly and synchronously through a magnetic reproducing apparatus when reading. Substantially, it brings much inconvenience in pinpointing exactly the paragraph that one intends to read, which therefore wastes time and effort.

Eric DeSmet, in U.S. Pat. No. 4,884,974 discloses an interactive talking book and audio player assembly which introduces an ROM module attached to the end margin of the back cover of a book in which is stored digitally recorded spoken text corresponding to the text printed on the pages of the book. Printed on the end margin of each book page is a page-identifying binary bar code formed by reflective and non-reflective elements. An audio player associated therewith comprises a base inlet adapted to receive the end margin of the back cover and to bring the terminals of the ROM module into engagement with the inlet contacts connecting the module to a speech unit for converting the digitally-recorded texts into audio signals to be amplified and reproduced. When a page of the book overlies the base inlet of the player, the bar code thereon is then exposed to ambient light which is reflected by the code elements toward an array of light sensors above the inlet for identifying the page. The page-identifying signals are transferred to the speech unit which then acts to read-out from the ROM module the spoken text corresponding to the printed text on the page.

In view of DeSmet's disclosure, it consists of numerous disadvantages outlined as follows:

a) it has structural complexity for adapting a ROM module in corporating with an optical sensing system therein that would be sophisticated and expensive to manufacture, b) the reflection of the page-identifying binary bar code by ambient light would cause operational unstability to the audio device because of the variation of the ambient light, c) the ROM module attached to an end edge of a book cover is damageable. Any stain existed on its surface could cause an ineffectiveness for the apparatus; and d) the complicated operation of the assembly brings inconvenience to the users especially the children.

SUMMARY OF THE PRESENT INVENTION

The present invention has a main object to provide a combination of a book with an audio device which is easy to operate and inexpensive to manufacture.

Another object of the present invention is to provide a combination of a book with an audio device which comprises a simplified touch-to-open device which is not affected by the ambient light circumstance.

Accordingly, the combination of a book with an audio device of the present invention comprises generally a book and an audio device attached to the back cover of the book.

The book comprises a front cover, a back cover and a plurality of double pages of text bound therein. The back cover is slightly extended outward to define a predetermined space for attaching the audio device thereon. An identification label attachs to each page of the book which is composed of an insulation tape printed with U-shape conductive stripes thereon.

The audio device comprises generally a rectangular housing having a speaker, a control circuit, an address generator, a ROM memory, an audio generator, a battery chamber disposed therein and a contact plate formed on an inward edge at a position corresponding to the labels on the end edge of the pages of the book, on which a plurality of conductive stripes are formed in registry with the U-shape stripes. Whereby, a slight pressing on the contact plate to make a transient engagement between the stripes of the contact plate and the label to achieves a short circuit which transfers a page-identifying matrix code (trigger signal) to the address generator for providing the identical address to the ROM memory which connects the corresponding information to a speech unit for converting the digitally-recorded contents into audio signals which are amplified and analogized before being transferred to the speaker. In this manner the reader of the selected text can hear what he is reading.

The present invention will be more fully understood by reference to the following detailed description thereof when read with the attached drawings.

DETAILED DESCRIPTION OF THE PREFERRED EMBODIMENT OF THE PRESENT INVENTION

Figure 1:
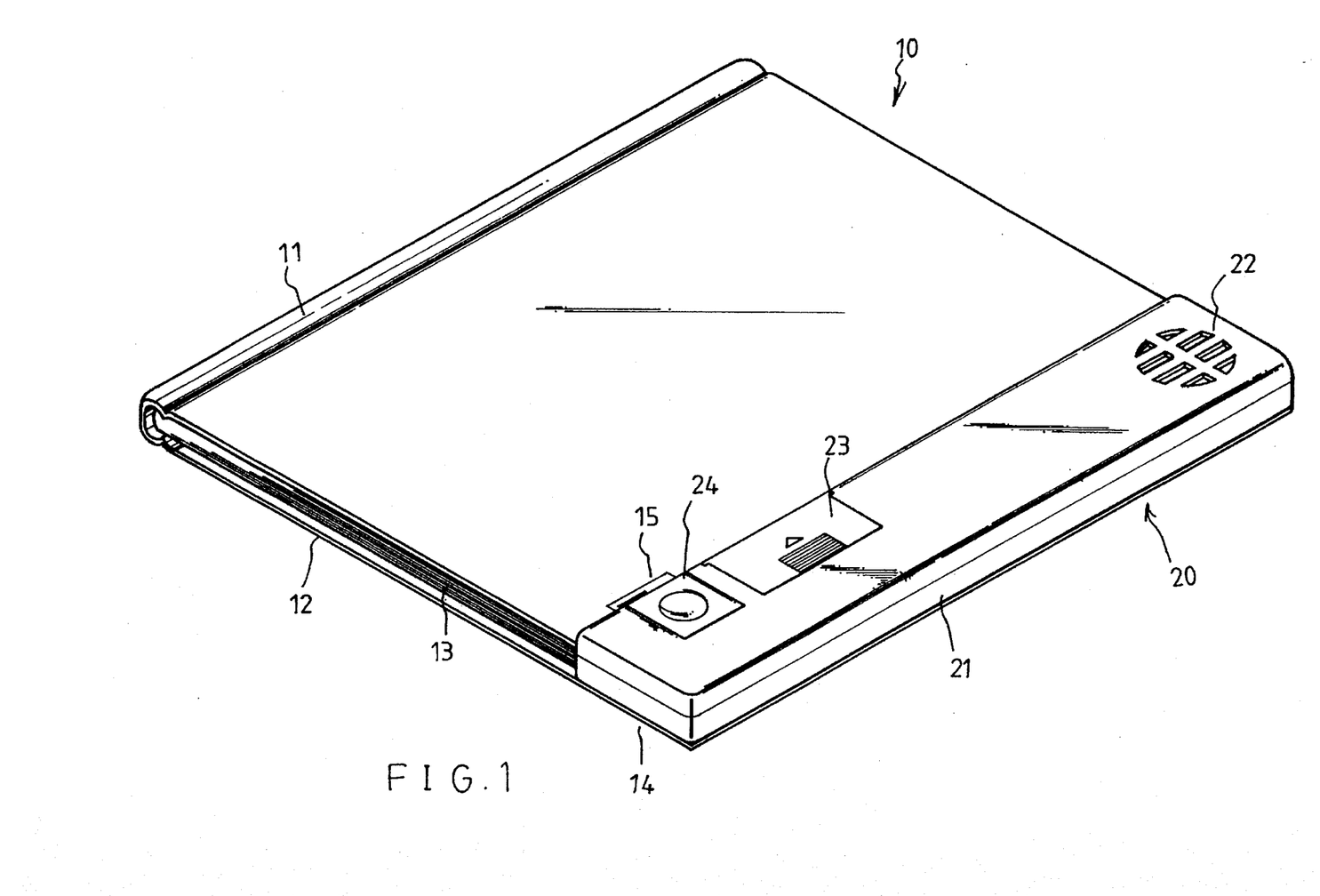
FIG. 1 is a perspective view to show a preferred embodiment of the present invention.
Figure 2:
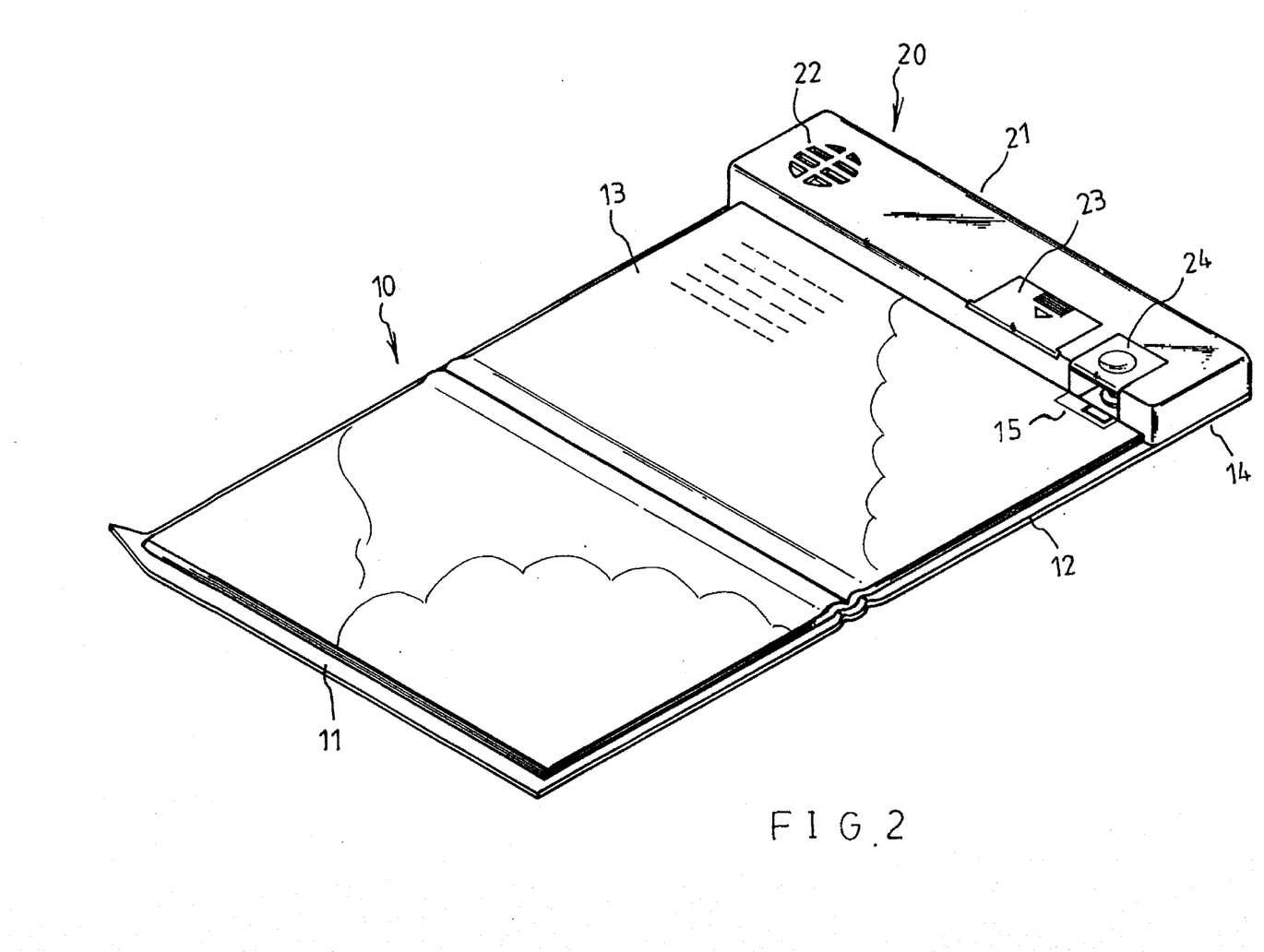
FIG. 2 is a perspective view to show the preferred embodiment of the present invention when the book is open.
Figure 3:
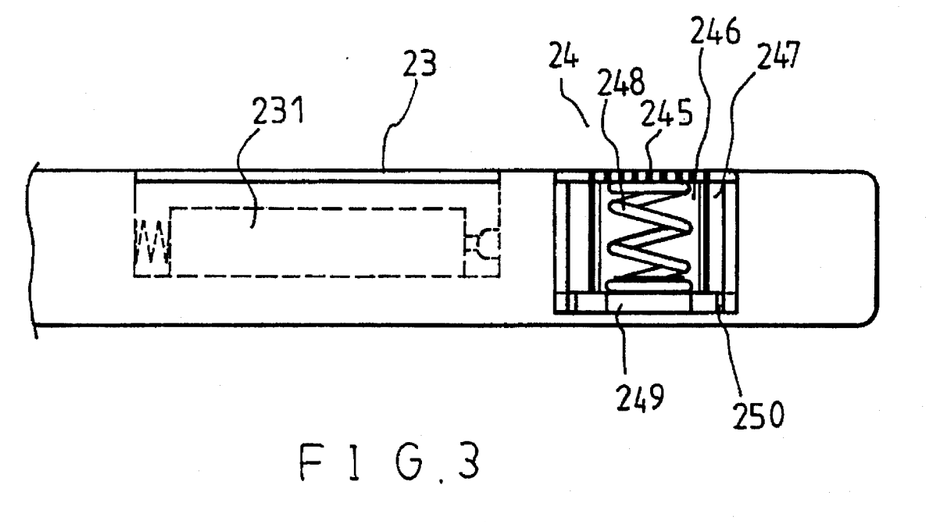
FIG. 3 is an elevational side view to show a contact plate biased by a coil spring inside a rectangular receiving space in the audio device.
Figure 4A:
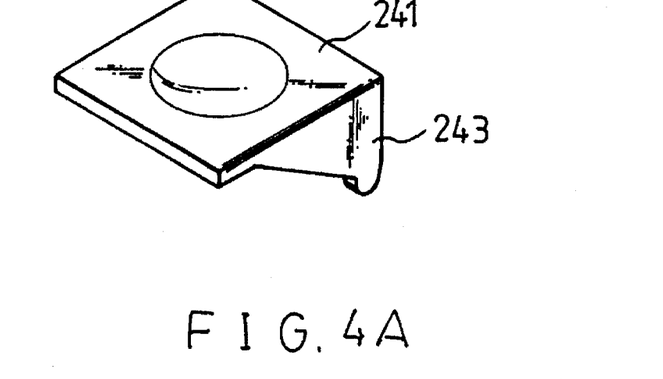
FIG. 4A to 4C are the perspective views to show the structure of the contact plate.
Figure 4B:
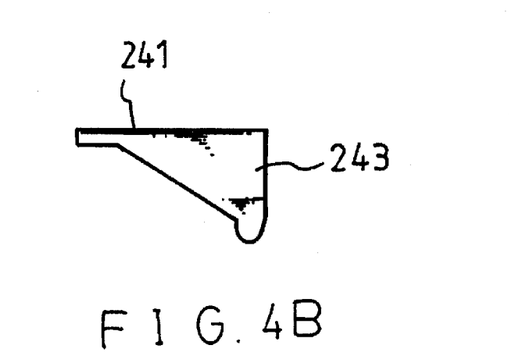
Figure 4C:
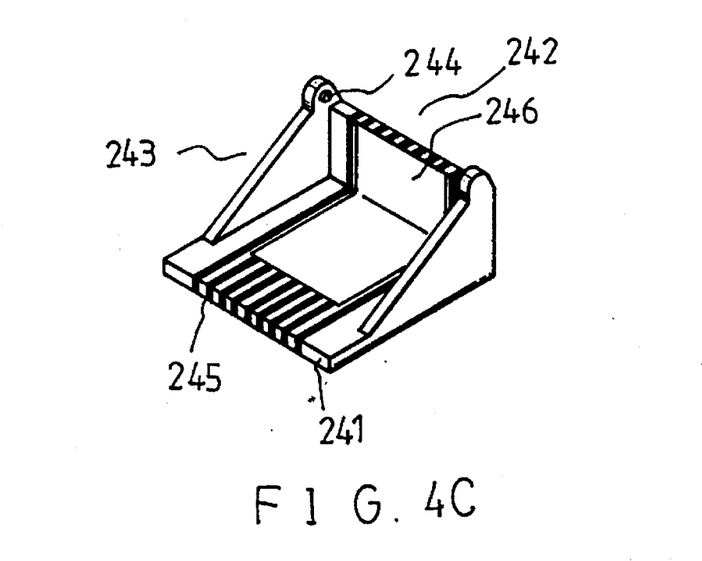

With reference to FIGS. 1 and 2 of the drawings, the combination of a book with an audio device of the present invention comprises generally a book 10 and an audio device 20 attached to the book 10 thereon.

The book 10 comprises a hard front cover 11, a hard back cover 12 and a plurality of double pages of text 13 being bound therein. The back cover 12 is slightly extended outward to define a predetermined rectangular space 14 for attaching the audio device 20 thereon.

An identification label 15 is attached to the end edge of each page 13 including the covers 11 and 12, at the position in the proximity of the lower right corner. The labels 15 are each composed of an insulation tape 151 being printed with an U-shape conductive stripe 152 thereon.

Figure 5A:
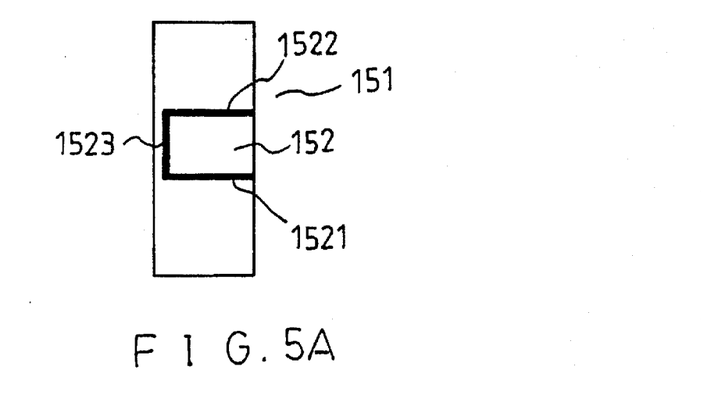
FIG. 5A to 5C are the top views to show the identification tapes which are printed U-shape conductive stripes of various size.
Figure 5B:
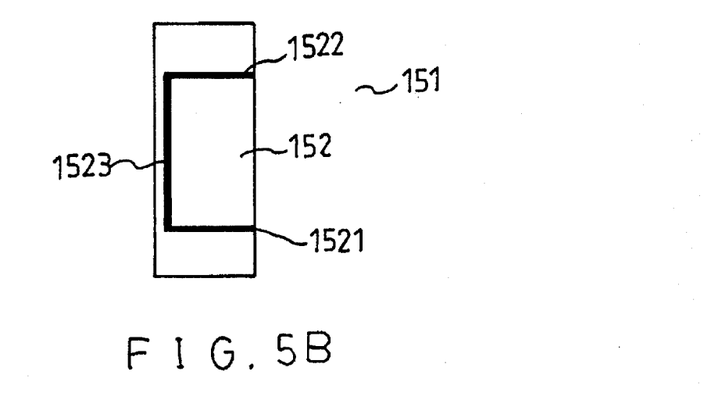
Figure 5C:
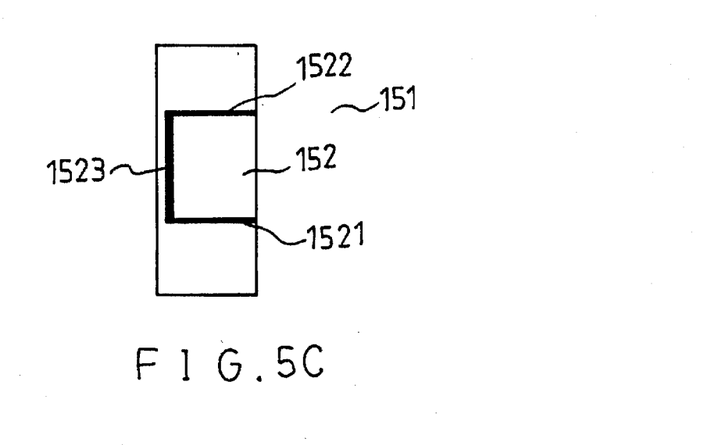

Referring to FIGS. 5A to 5C, the U-shape conductive stripe 152 is generally composed of a pair of transverse stripes 1521 and 1522 parallel extended to the right side edge and a vertical stripe 1523 connected with the left ends of the transverse stripes 1521 and 1522 to form a bridge therebetween. The distance between each pair of the transverse stripes 1521 and 1522 varies in each label depending upon the predetermined arrangement of the identification code for each page of the book.

Referring to FIG. 1 again, the audio device 20 comprises a rectangular housing 21 having a speaker 22 on the upper section, a battery chamber 23 and a contact plate 24 on the lower section. A set of electronic components such as a control circuit, an address generator, a ROM memory and an audio generator are disposed therein (not shown). These components are of the conventional types and their operations will be discussed below.

Referring to FIGS. 3 and 4A to 4C, the power for the audio device is supplied by battery 231 inside the battery chamber 23 which is connected to the various stages of the audio device. The contact plate 24 comprises a rectangular plate 244, an outcurved back wall 242, a pair of roughly triangular lateral walls 243 having an axle pin 244 protruded inward from the inner surface of the lower section of each lateral wall 243. The contact plate 24 is made of insulation material and further has a plurality of conductive stripes 245 disposed in parallel on the inner surface in a horizontal direction and connected on the inward ends to the respective electronic components inside the housing 21. An insulation sheet 246 covers most of the stripes 245 to protect the stripes 245 from being contacted.

Figure 6A:
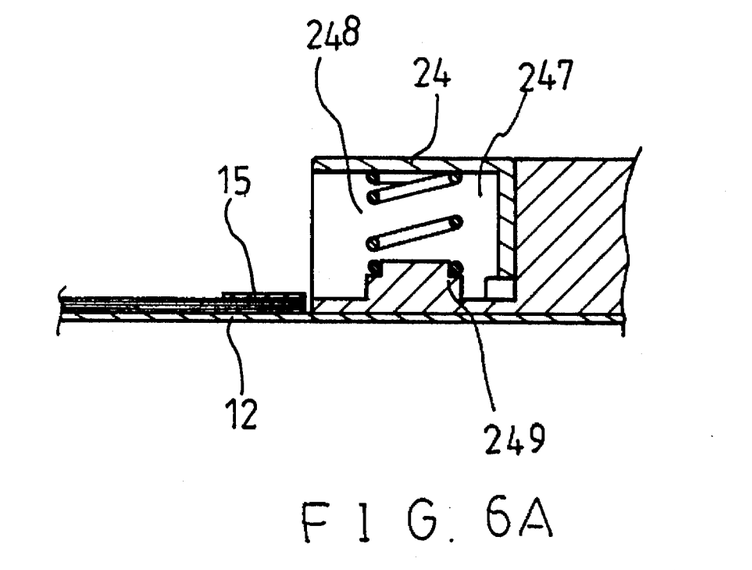
FIG. 6A and 6C are the sectional views to show the contact plate being operated to touch an identification label according to the present invention.
Figure 6B:
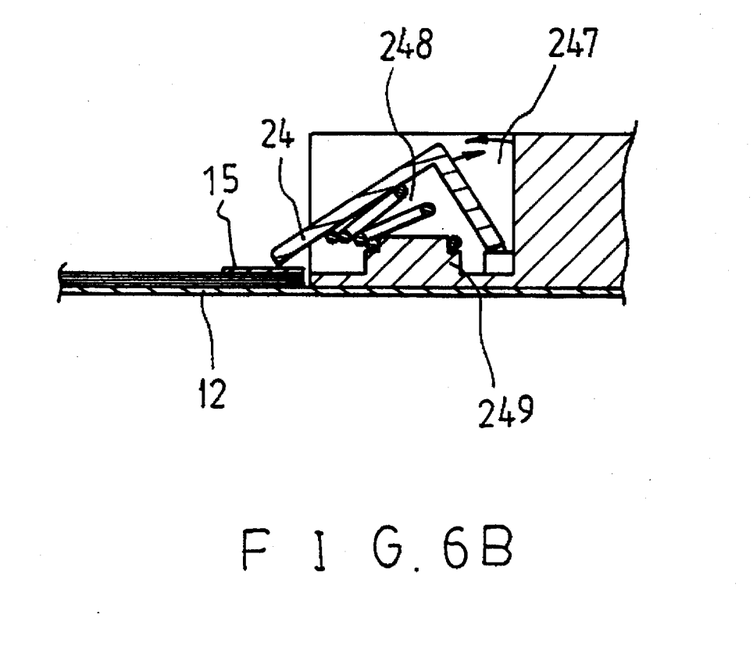

The contact plate 24 is pivotally connected to a pair of axle lugs 250 formed at the bottom of the respective inner walls inside a rectangular chamber 247 and biased on the under side by a coil spring 248 which is anchored to a circular projection 249 on the central bottom of the chamber 247. In this manner the back side of the contact plate 24 is normally stopped against the back wall of the chamber 247 (as shown in FIG. 6A). A slight pressing applied on the upper surface of the contact plate 24 will move the plate 24 to incline to thereby make a transient engagement with the identification label 15 on the book page 13. The contact plate 24 is then resiled by the spring 248 immediately upon the releasing of the finger (as shown in FIG. 6B). It is important that the location of the label 15 must be exactly in registry with the contact plate 24 in order that the pair of the transverse stripes 1521 and 1522 can precisely pinpoint the respective stripes 245 on the contact plate 24.

Figure 7:
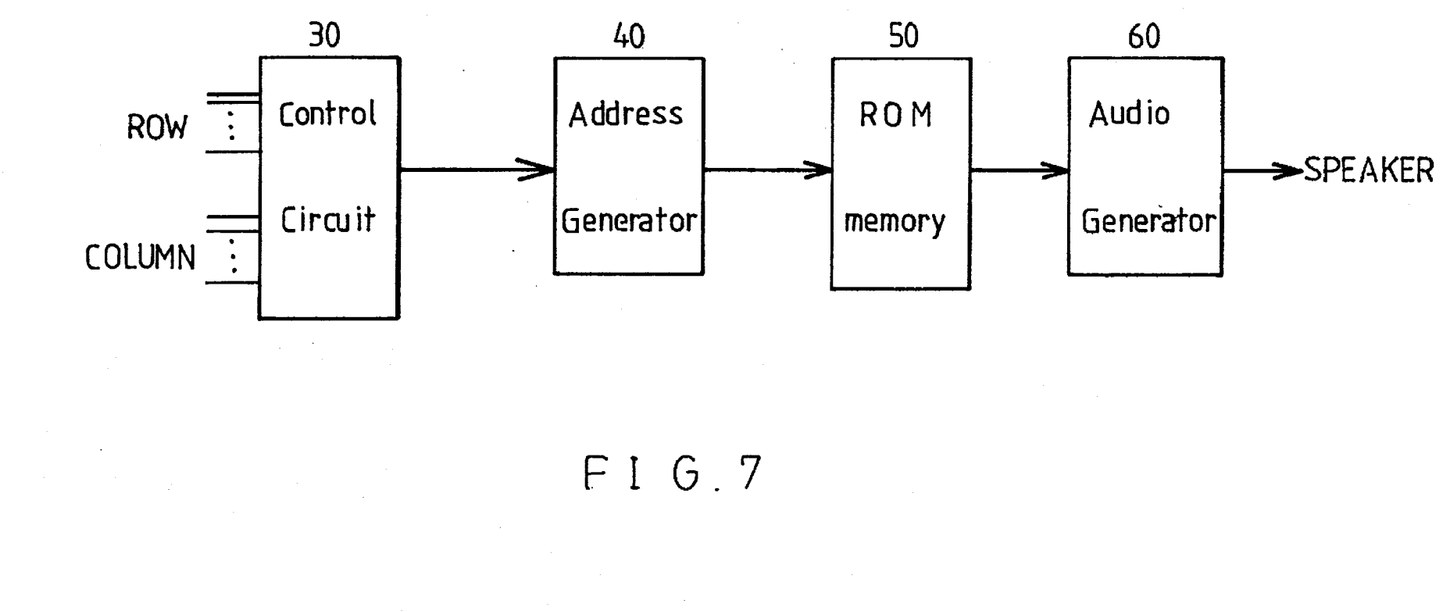
FIG. 7 is a flowchart to illustrate the operational process of the audio device.

Referring to FIG. 7, a flowchart illustrates the functions of the components inside the audio device. The first block indicates a control circuit 30 which receives the trigger signal (Matrix code) from the contact plate 24 and controls the emitting, stopping or repeating of the audio signal. The second block represents an address generator 40 which accrues different audio addresses in accordance with the identifying code transferred from the control circuit 30. The third block indicates a ROM memory 50 in which the spoken messages corresponding to the portions of the contents of the book pages are pre-stored. The ROM memory 50 will extract the digitized sample signal of the corresponding spoken message according to the respective address. The signal is fed in sequence to a digital-to-analog converter before it is transferred to the fourth block indicating an audio generator 60. The signal is then transferred to the speaker 22 where it is amplified and reproduced.

Figure 8:
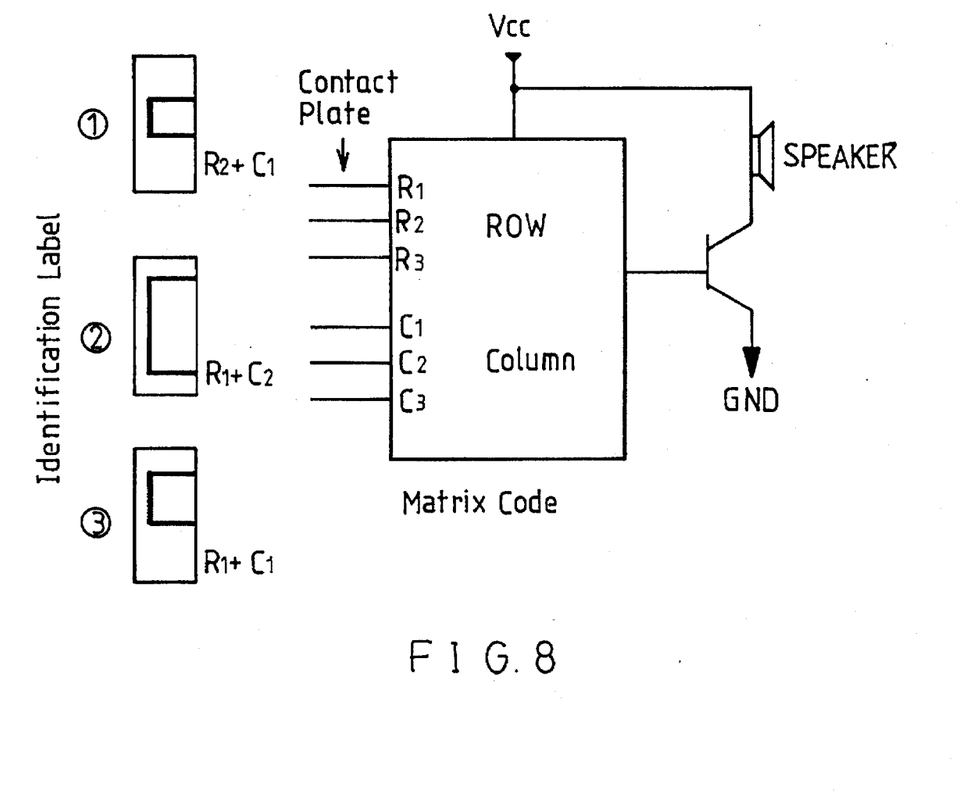
FIG. 8 is an exemplary circuit diagram to indicate the function of the identification label relating to the operation of the audio device.

Referring to FIG. 8, a simple circuit diagram is provided to illustrate an exemplary mode showing the function of the identification label 15 as it relates to the contact plate 24. It is presumed that there are six stripes on the contact plate 24 representing three rows R1, R2 and R3, and three columns C1, C2 and C3. The pairs of the transverse stripes on the identification labels 1, 2, and 3 are positionally directed to the respective row and column on the plate 24. Taking the conductive stripes of the label 1 for example, the first stripe thereof will direct to R2 and the second stripe will direct to C1 when engaged with the contact plate 24. A matrix code of R2+C1 is accrued to trigger off the control circuit 30 which will process in the sequence as described above. With respect to the labels 2 and 3, the transverse stripes of them direct respectively to R1, C2 and R1, C1 so that they accrue the matrix codes of R1+C2 or R1+C1. Since the identification labels 15 attached to the pages 13 of the book 10 are different from each other, no confusion will result when any one of them engages with the second contact plate 24. This arrangement assures that when the contact plate 24 engages with a label 15 on any page 13, the spoken message from the ROM memory corresponding to the printed contents on that page will be extracted and the reader of this page can hear what he is reading.

The device of the present invention is not necessarily operated in sequential order. Thus the reader can start from the first page or the last page or from any page thereinbetween. The identification labels 15 may also be attached to the covers 11 and 12 for reading the name or necessary desciptions thereon.

The touch-to-open device of the present invention provides greater advantage to the user. Therefore, a transient engagement of the contact plate 24 with the identification label 15 is enough to trigger off the audio device 20 to speak out all the contents continuously on a desired page. Pressing any longer on the contact plate 24 will not affect the continuous process of the audio device until the device completes the entire content on the page and stops automatically. But repeated application of the touch-to-open movement upon the contact plate will cause an interception and lead the process back to the first sentence again. Furthermore, if the reader wants to stop hearing the content on a page, he may turn to a desired page and press the contact plate 24, and the speaking for the prior page will then be stopped and the speaking will begin at the new page. This arrangement also provides great convenience to the readers for their freedom in use of the device, especially the children. They can even hear the device of the present invention from a remote location or in darkness.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A combination of a book with an audio device for audibly reproducing predetermined texts printed on a book page, comprising:

a book having a hard back cover extended outward to define an extension, said book further including a plurality of pages, each carrying a printed text and an identification label attached along an end margin of the page, wherein the identification label is composed of an insulation tape having printed thereon an U-shape conductive stripe for identifying the page;

an audio device attached to the extension of said back cover, said audio device including a rectangular housing having a battery chamber, a control circuit, an address generator, a ROM memory, an audio generator and a speaker interrelatedly disposed therein, and a contact plate pivotally secured to a lower inward edge of said audio device, said contact plate arranged to precisely engage with said identification label on said book pages;

wherein a transient engagement of said contact plate with said identification label creates a trigger signal corresponding to an identified address for extracting a spoken message from said ROM memory, wherein the spoken message corresponds to the printed text on said page, said spoken message being then connected to said speaker for audibly reproducing said printed text on said page.

2. A combination according to claim 1, wherein said ROM memory has pre-stored digitally recorded spoken text corresponding to said printed text on said pages of said book.

3. A combination according to claim 1, wherein said contact plate has a plurality of conductive stripes spacedly disposed in parallel on an inner surface thereof, along a horizontal direction, wherein said conductive stripes of said contact plate are connected on their inner ends to respective electronic means provided inside said housing.

4. A combination according to claim 3, wherein said each conductive stripe belongs to a predetermined row or column for forming a signal code.

5. A combination according to claim 1, wherein said U-shape conductive stripe has a pair of first and second transverse stripes being bridged on inward ends by a vertical stripe.

6. A combination according to claim 5, wherein each U-shape conductive stripe of said identification label is positionally or dimensionally different from the remaining U-shape conductive stripes.

7. A combination according to claim 5, wherein said first transverse stripe is directed to a respective stripe of said contact plate which corresponds to a number of a predetermined row and said second transverse stripe is directed to a respective stripe of said contact plate which corresponds to a number of a predetermined column.

8. An audio book, comprising:

a book including:
  a front cover,
  a back cover which includes an outwardly defined extension,
  a plurality of pages between the front cover and the back cover,
  an identification label for identifying a page provided along an edge of at least one page, wherein the identification label includes an insulation portion and a conductive stripe; and an audio device attached to the extension of the back cover of the book, said audio device including:
  a housing having an audio generator and a speaker disposed therein, and
  a contact plate pivotally connected to the housing of the audio device, wherein the contact plate is arranged to engage with the identification label on the page by pivoting the contact plate toward the identification label, wherein engagement of the contact plate with the identification label on the page generates a trigger signal to activate the audio generator to generate a spoken message relating to the page.

9. An audio book according to claim 8, wherein the contact plate includes a top wall and two lateral walls extending from opposite sides of the top wall.

10. An audio book according to claim 9, wherein the top wall is generally rectangular shaped and the lateral walls are generally triangular shaped.

11. An audio book according to claim 10, wherein the contact plate is pivotally connected to the housing of the audio device by at least one axle pin which connects a bottom of at least one lateral wall with the housing.

12. An audio book according to claim 9, wherein the contact plate is pivotally connected to the housing of the audio device by at least one axle pin which connects a bottom of at least one lateral wall with the housing.

13. An audio book according to claim 12, further including a spring connected between the top wall of the contact plate and the housing of the audio device.

14. An audio book according to claim 13, wherein the spring biases the contact plate so that the top wall of the contact plate is essentially flush with a top surface of the housing of the audio device.

15. An audio book according to claim 9, wherein the top wall of the contact plate includes a plurality of conductive stripes which contact the conductive stripe of the identification label.

16. An audio book according to claim 15, wherein the contact plate is pivotally connected to the housing of the audio device by at least one axle pin which connects a bottom of at least one lateral wall with the housing.

17. An audio book according to claim 16, further including a spring connected between the top wall of the contact plate and the housing of the audio device.

18. An audio book according to claim 8, further including a spring connected between the contact plate and the housing of the audio device, and at least one axle pin connecting the contact plate to the housing, wherein the spring biases the contact plate in a position away from the identification label, wherein when a user pushes the contact plate against a biasing force of the spring, a portion of the contact plate extends over the page and then contacts the conductive stripe of the identification label to thereby generate the trigger signal which activates the audio device to generate the spoken message.

19. An audio book according to claim 8, wherein the spoken message exactly corresponds to a printed text included on the page having the identification label.

20. An audio book according to claim 8, wherein the front cover includes an identification label.

* * * * *